(12) United States Patent
Herrmann et al.

(10) Patent No.: US 10,135,321 B2
(45) Date of Patent: Nov. 20, 2018

(54) HEATSINK DESIGN WITH THERMAL INSULATOR TO REDUCE ENCODER TEMPERATURE

(71) Applicant: Rockwell Automation Technologies, Inc., Mayfield Heights, OH (US)

(72) Inventors: Steven Herrmann, Chaska, MN (US); Chetan Chandrasekara, Chanhassen, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 36 days.

(21) Appl. No.: 15/364,609

(22) Filed: Nov. 30, 2016

(65) Prior Publication Data

US 2017/0126102 A1    May 4, 2017

Related U.S. Application Data

(63) Continuation-in-part of application No. 13/617,202, filed on Sep. 14, 2012, now Pat. No. 9,543,811.

(51) Int. Cl.
*H02K 9/22* (2006.01)
*H02K 11/21* (2016.01)
*H02K 15/02* (2006.01)

(52) U.S. Cl.
CPC ............ *H02K 9/22* (2013.01); *H02K 11/21* (2016.01); *H02K 15/02* (2013.01); *H02K 2213/03* (2013.01)

(58) Field of Classification Search
CPC .... H02K 2213/03; H02K 11/21; H02K 5/225; H02K 5/18; H02K 5/20; H02K 9/22; H02K 11/215; H02K 11/22; H02K 11/225

USPC .................................. 310/52, 71, 64, 68 B
See application file for complete search history.

(56) References Cited

U.S. PATENT DOCUMENTS

| | | | |
|---|---|---|---|
| 3,271,601 A | | 9/1966 | Raver |
| 3,458,739 A | | 7/1969 | Zelinski et al. |
| 3,554,466 A | | 1/1971 | Paine et al. |
| 3,581,131 A | | 5/1971 | Richter |
| 4,525,642 A | * | 6/1985 | Humphries ............ H02K 3/505 310/260 |
| 4,535,262 A | * | 8/1985 | Newberg ................. H02K 5/10 310/88 |
| 5,810,568 A | | 9/1998 | Whitefield |

(Continued)

FOREIGN PATENT DOCUMENTS

JP          60203813       10/1985
KR     100901751 B1 *    6/2009

OTHER PUBLICATIONS

KR 100901751 B1 English Translation.*

(Continued)

*Primary Examiner* — Quyen P Leung
*Assistant Examiner* — Robert E Mates
(74) *Attorney, Agent, or Firm* — Fay Sharpe LLP

(57) ABSTRACT

An electric motor assembly including a housing, an electric motor supported in a motor compartment of the housing, an encoder operatively coupled to the electric motor and supported in an encoder compartment of the housing, and a heat sink surrounding at least a portion of the encoder, the heat sink in thermal contact with an end cap of the housing at least partially defining the encoder compartment, whereby the heat sink is adapted to absorb heat from the encoder and conduct heat to the end cap.

20 Claims, 7 Drawing Sheets

(56) References Cited

U.S. PATENT DOCUMENTS

| | | | |
|---|---|---|---|
| 5,920,164 A * | 7/1999 | Moritz | H02K 9/20 |
| | | | 318/135 |
| 5,932,942 A * | 8/1999 | Patyk | H02K 11/33 |
| | | | 310/58 |
| 6,008,552 A | 12/1999 | Yagoto et al. | |
| 6,081,056 A | 6/2000 | Takagi | |
| 6,177,740 B1 | 1/2001 | Burns | |
| 6,710,490 B1 | 3/2004 | Whaley | |
| 7,122,928 B2 | 10/2006 | Shindo | |
| 7,199,496 B2 | 4/2007 | Suzuki et al. | |
| 2002/0079845 A1 * | 6/2002 | Kirkpatrick | H01J 61/025 |
| | | | 315/248 |
| 2006/0012254 A1 | 1/2006 | Einheuser et al. | |
| 2006/0091743 A1 | 5/2006 | Iwasaki et al. | |
| 2006/0203429 A1 * | 9/2006 | Thrap | H01G 2/02 |
| | | | 361/502 |
| 2006/0250772 A1 * | 11/2006 | Salmonson | G06F 1/20 |
| | | | 361/698 |
| 2008/0203596 A1 | 8/2008 | Okada | |
| 2010/0019135 A1 | 1/2010 | Eckert | |
| 2010/0176669 A1 * | 7/2010 | Houle | H02K 5/20 |
| | | | 310/54 |
| 2010/0213798 A1 | 8/2010 | Yuan | |
| 2011/0052432 A1 | 3/2011 | Cunningham | |
| 2011/0193432 A1 | 8/2011 | Takechi | |
| 2011/0213395 A1 | 9/2011 | Corrington et al. | |

OTHER PUBLICATIONS

Parker Hannifin/Chomerics Data Sheet (excerpt) "High Thermal Conductivity Gap Filler Pads" (THERM-A-GAP G974 and 976), pp. 13 and 14.

3M Electronics Markets Materials Division, Data Sheet "Thermally Conductive Silicone Interface Pads 5519 and 5519S", Dec. 2013, pp. 1-3.

The Bergquist Company, Data Sheet, "Gap Pad 3000S30", one page.

* cited by examiner

HEATSINK DESIGN WITH THERMAL INSULATOR TO REDUCE ENCODER TEMPERATURE

CROSS REFERENCE TO RELATED APPLICATION

This application is a continuation-in-part of U.S. application Ser. No. 13/617,202 filed Sep. 14, 2012, and the entire disclosure of said prior application is hereby expressly incorporated by reference into the present specification.

BACKGROUND

The present exemplary embodiment relates generally to electric motors. It finds particular application in conjunction with electric motors having encoders, and will be described with particular reference thereto. However, it is to be appreciated that the present exemplary embodiment is also amenable to other like applications.

Electric motors commonly include certain electronic devices mounted or supported in a common housing with the rotating elements of the electric motor. Examples of such electronic devices include switching devices, resistors, encoders, etc. It is well known that such electronic devices generally have a limited operating temperature range and that heat generated by the electric motor and/or the electronics themselves can result in unfavorable operating environments. If the thermal issues are not addressed, the electronic components may overheat and malfunction, or fail altogether.

In some applications, motor output can be limited by thermal issues. For example, a motor with an encoder may experience increased temperatures when operating at high RPMs. This can be due to increased heat generated by the motor, as well as self-heating of the encoder as it spins at high speeds. Current practice is to reduce torque output of a motor when operating at the higher RPMs in order to reduce heat output and thereby maintain the encoder at a suitable operating temperature. Such an approach is less than ideal since it prevents a motor from being used at full capacity, or requires the use of a larger motor than would otherwise be necessary for a given application.

Other approaches have also been developed for addressing thermal issues. For example, fans have been provided for circulating air around a motor housing to remove excess heat therefrom. While effective, fans increase cost and require additional space. Another approach has been to provide externally mounted heat sinks that are designed to transfer heat from the motor to an exterior of the motor housing, thus lowering the temperature within the motor housing. Again, such an approach generally requires additional space. Still another approach has been the provision of liquid cooling systems. The cost of such systems, however, is generally very high and designing a system with suitable performance for an electric motor is fairly complicated.

BRIEF DESCRIPTION

The present disclosure sets forth an electric motor with improved thermal management. The improvement in thermal management is achieved at low cost, without increasing overall motor dimensions, and without moving parts.

In accordance with one aspect, an electric motor assembly comprises a housing, an electric motor supported in a motor compartment of the housing, an encoder operatively coupled to the electric motor and supported in an encoder compartment of the housing, a thermal insulator between the motor compartment and the encoder compartment for thermally isolating the motor compartment from the encoder compartment, a heat sink surrounding at least a portion of the encoder, the heat sink in thermal contact with an end cap of the housing at least partially defining the encoder compartment, whereby the heat sink is adapted to absorb heat from the encoder and conduct heat to the end cap, and a first thermal pad interposed between the encoder and the heat sink.

The first thermal pad can be a resilient thermal pad interposed in an annular space between the encoder and the heat sink. The first thermal pad can be a silicone fiberglass reinforced thermal pad. The first thermal pad can be secured to at least one of the encoder or heat sink. The assembly can further comprise an adhesive securing the first thermal pad to at least one of the encoder or heat sink. The heat sink can include a central cavity adapted to receive the encoder. The encoder and the heat sink can be generally cylindrical and arranged coaxially. The assembly can further comprise a second thermal pad interposed between the heat sink and the end cap. The heat sink can include a plurality of radially extending fins. The heat sink can be a monolithic cast structure, such as diecast aluminum.

In accordance with another aspect, an end cap assembly for an electric motor assembly comprises an endcap housing having an encoder compartment, and a heat sink mounted to the endcap housing, wherein the heat sink includes a cylindrical central cavity extending between and opening to opposite axial end faces of the heat sink for receiving an encoder of the electric motor assembly, and a first thermal pad fixed to an inner circumferential surface of the central cavity, the heat sink being in thermal contact with the end cap housing whereby when the end cap assembly is attached to an electric motor, the heat sink is adapted to absorb heat from the encoder and conduct heat to the end cap housing.

The first thermal pad can be a resilient thermal pad. The first thermal pad can be a silicone fiberglass reinforced thermal pad. The first thermal pad can be secured to at least one of the encoder or heat sink. The end cap assembly can further comprise an adhesive securing the first thermal pad to at least one of the encoder or heat sink. The heat sink is can be an annular shape. The cavity can be centrally located. The heat sink can be a monolithic cast structure. The heat sink can be diecast aluminum.

DETAILED DESCRIPTION

Figure 1:
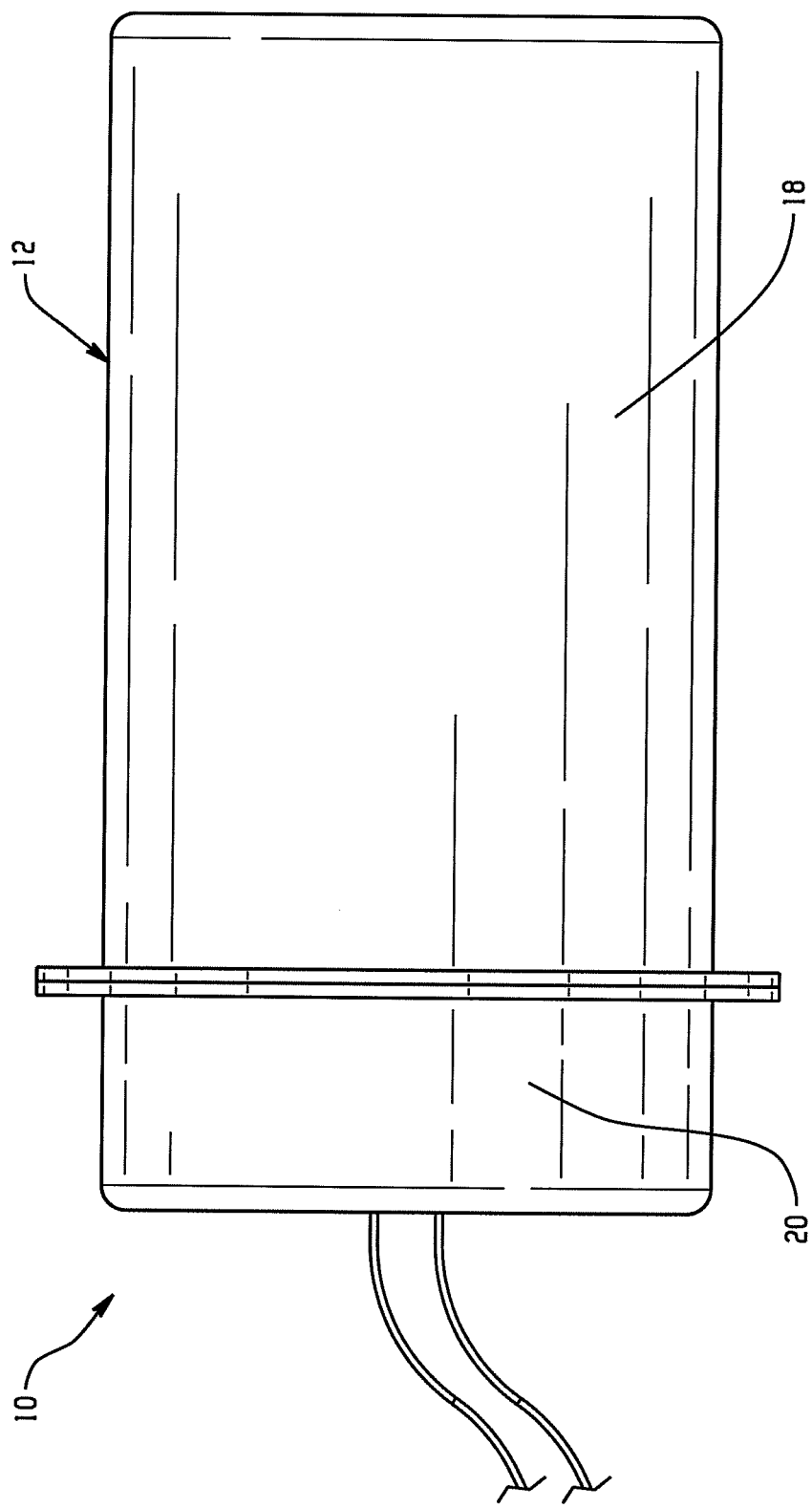
FIG. 1 is a side view of an exemplary electric motor assembly in accordance with the present disclosure.
Figure 2:
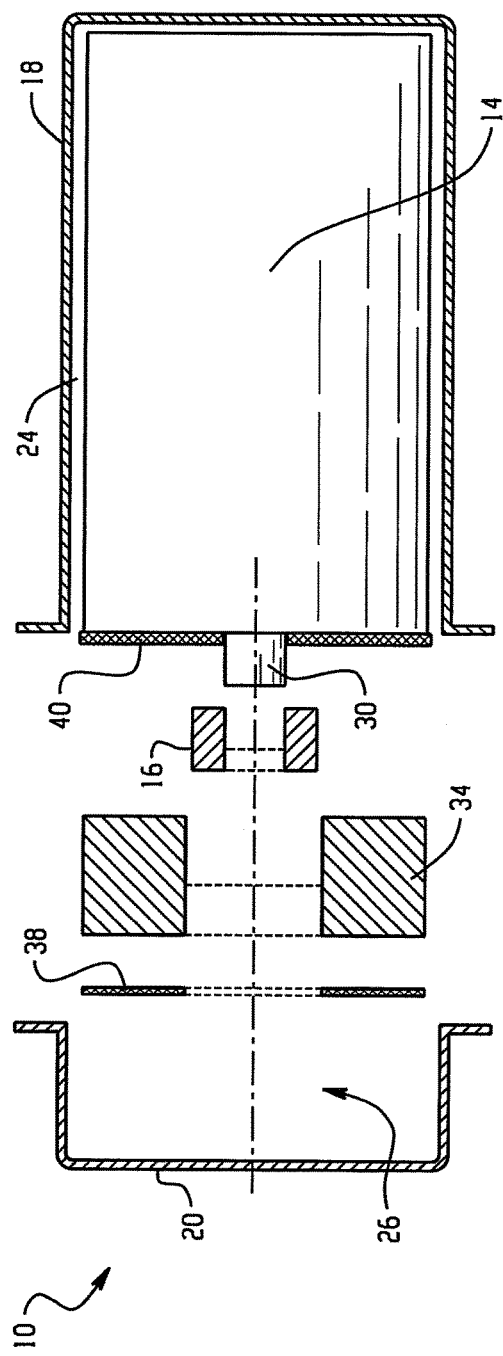
FIG. 2 is an exploded view of the motor assembly of FIG. 1.
Figure 3:
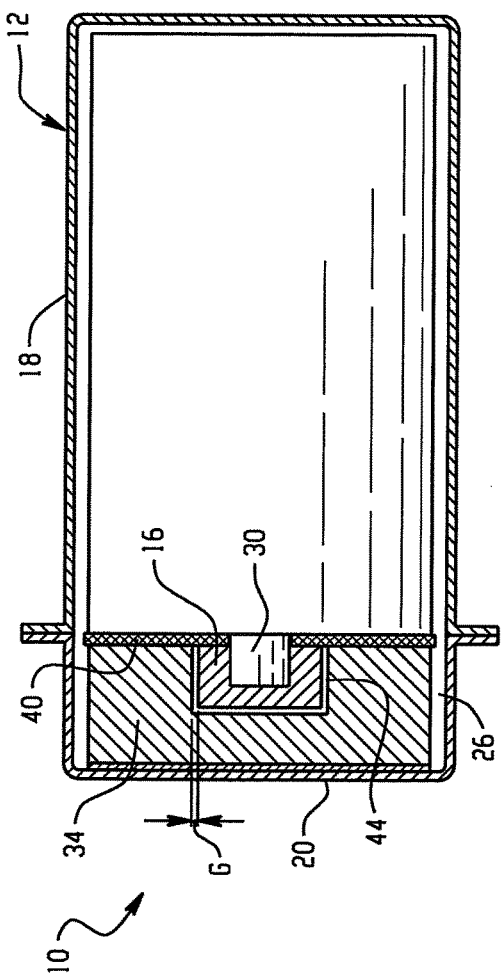
FIG. 3 is a partial cross-sectional view of the motor assembly of FIG. 1.

With reference to FIGS. 1-3, an exemplary electric motor assembly in accordance with the present disclosure is illustrated and identified generally by reference numeral 10. The electric motor assembly generally comprises a housing 12 in which an electric motor 14 and an encoder 16, among other components, are supported. The housing is comprised of two main components, a motor housing portion 18 and an encoder housing portion, referred to herein as an end cap 20. The motor housing portion 18 includes a motor compartment or cavity 24 in which the motor 14 is supported, and the end cap 20 defines an encoder compartment or cavity 26 in which the encoder 16 is contained. It will be appreciated that the motor compartment 24 and encoder compartment 26 are exemplary in nature, and other configurations are possible. For example, a single housing component can include both the motor compartment and the encoder compartment.

As best seen in FIG. 3, the encoder 16 is mounted axially coextensive with a portion of a shaft 30 of the motor 14. In accordance with the present disclosure, a heat sink 34 surrounds the encoder 16. The heat sink 34 is in thermal contact with the end cap 20 of the housing such that the heat sink 34 is adapted to absorb heat from the encoder 16 and/or other heat sources such as bearings or the motor 14 itself, and conduct heat to the end cap 20. To this end, an optional thermal pad 38 is compressively interposed between a surface of the heat sink 34 and the end cap 20. The thermal pad 38 can be a flexible and/or resilient material that ensures contact between the heat sink 34 and the end cap 20. It will be appreciated that thermal pads can also be provided around the circumference of the heat sink 34 if desired. To further isolate the encoder compartment 26 from heat generated by the motor 14, insulating material 40 is interposed between the motor compartment 24 and the encoder compartment 26.

Figure 4:
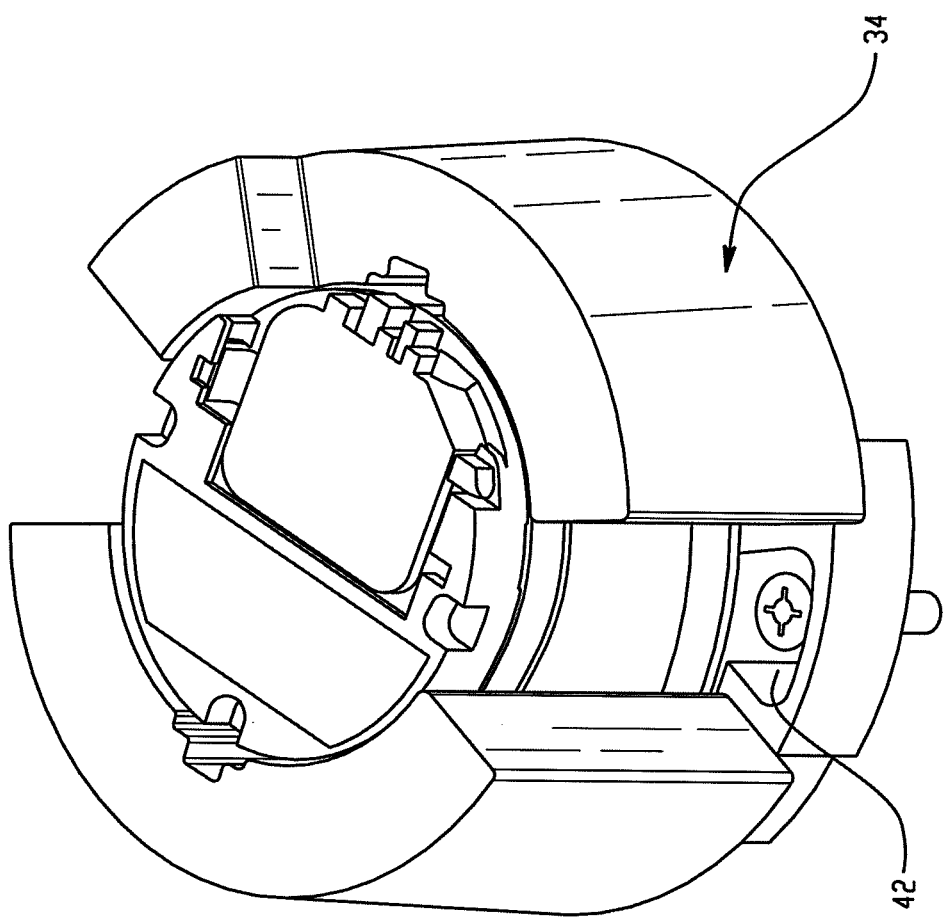
FIG. 4 is a perspective view of an exemplary heat sink and encoder in accordance with the disclosure.

Turning to FIG. 4, the details of the exemplary heat sink 34 will be described. The heat sink 34 includes mounting holes 42 for securing the heat sink 34, via bolts or other fasteners that may also secure the end cap 20, to the motor housing portion 18 of the housing 12. The encoder 16 and the heat sink 34 are generally cylindrical and arranged coaxially, with the encoder being received in a central cavity 44 (see FIG. 3) of the heat sink 34. In the illustrated embodiment, a small air gap G between the encoder 16 and the heat sink 34 allows air to circulate therebetween. The air gap G also prevents any interference issues that could result if the encoder 16 were friction fit within the heat sink 34. Although, in some applications, contact between the heat sink 34 and the encoder 16 is acceptable, as would be the provision of a thermal pad, paste, or the like.

Figure 5:
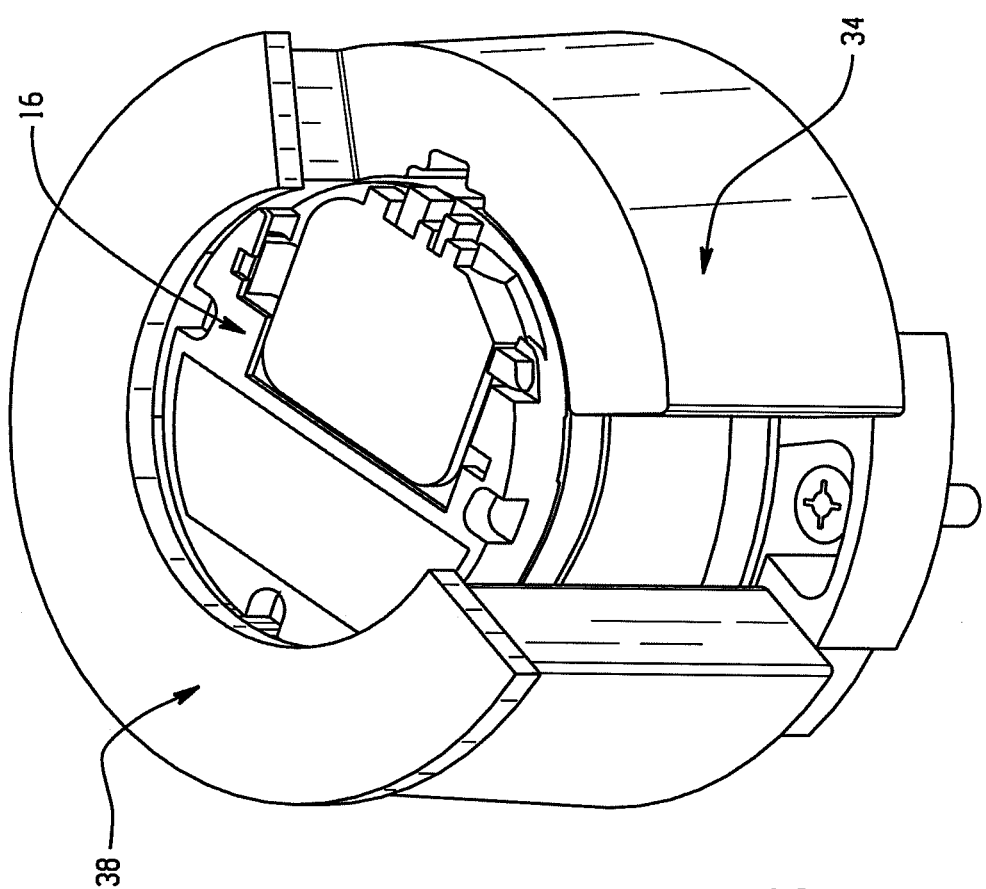
FIG. 5 is a perspective view of the heat sink of FIG. 4 including a thermal pad.

Turning to FIG. 5, the heat sink 34 is illustrated with thermal pad 38 in place.

Figure 6:
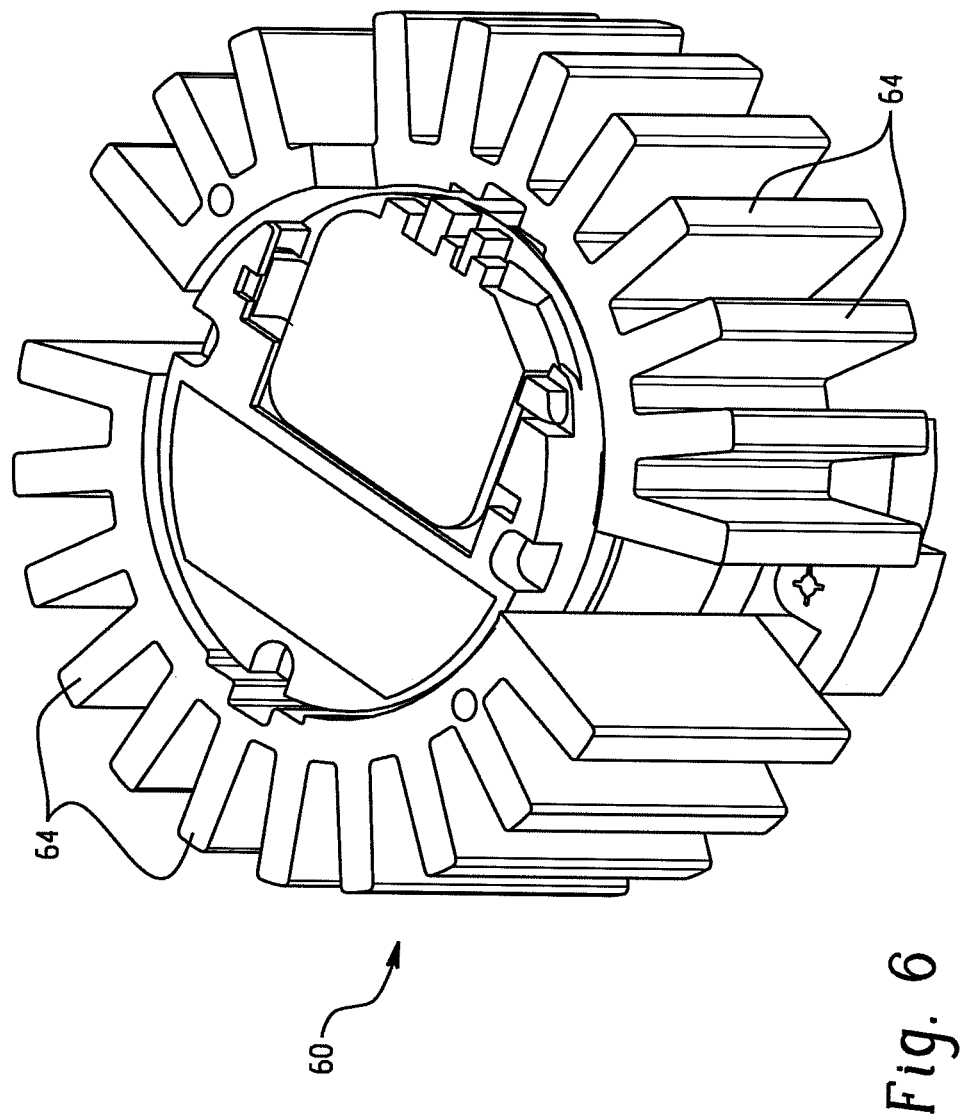
FIG. 6 is a perspective view of another exemplary heat sink and encoder in accordance with the disclosure.
Figure 7:
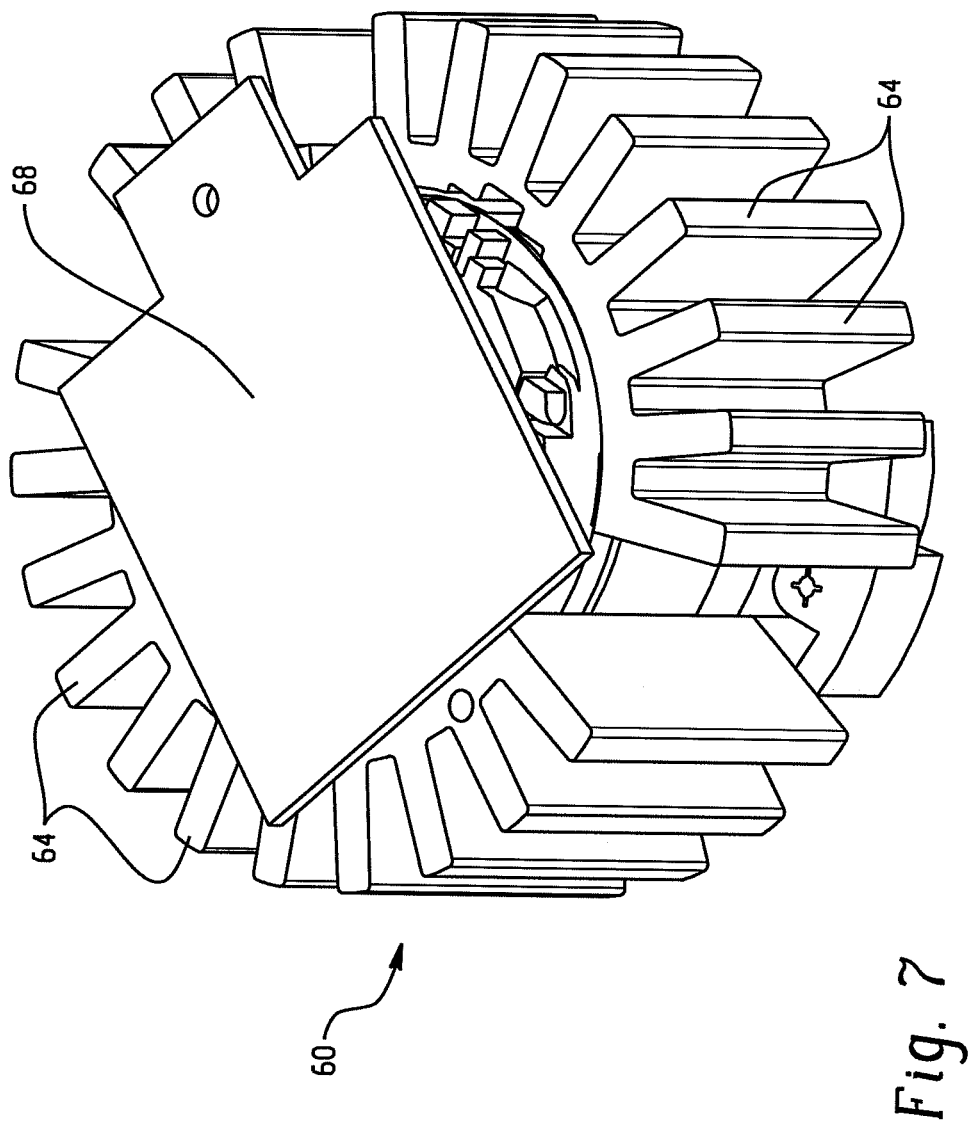
FIG. 7 is a perspective view of the heat sink of FIG. 6 including a thermal bridge.

In FIGS. 6 and 7, an alternative embodiment of a heat sink in accordance with the present disclosure is illustrated. In this embodiment, the heat sink 60 is generally the same as the heat sink 34 described in connection with FIGS. 1-5, but includes a plurality of radially extending fins 64. In addition, as illustrated in FIG. 7, a thermal bridge 68 is illustrated instead of the thermal pad 38 of FIGS. 1-5. The thermal bridge 68 in this embodiment is a curved or concave metal spring element configured to be compressed between the end cap 20 and the heat sink 64 when installed in the housing 12.

The thermal bridge 68 maintains thermal contact between the heat sink 60 and the end cap 20 to ensure heat transfer therebetween.

Figure 8:
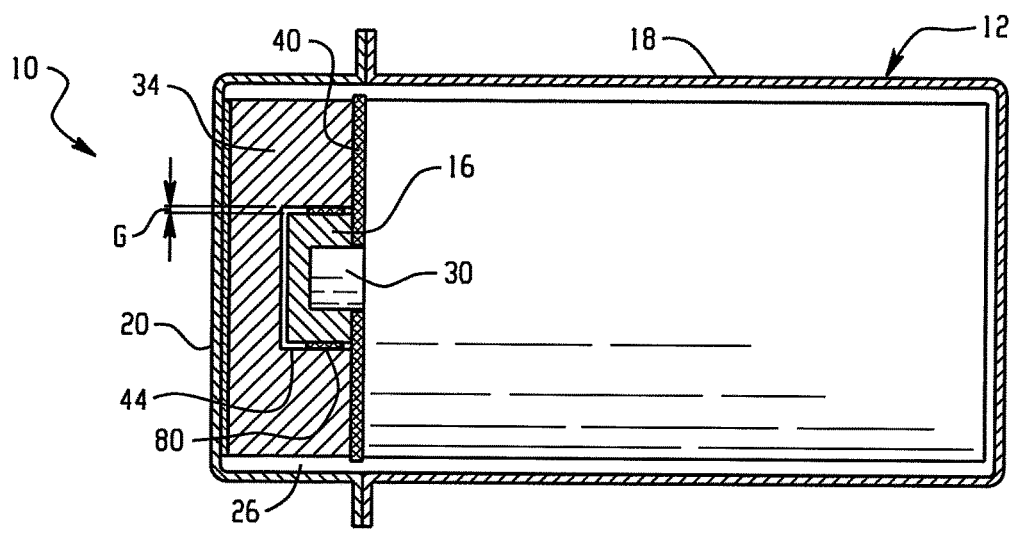
FIG. 8 is a partial cross-sectional view of another exemplary electric motor assembly in accordance with the present disclosure.
Figure 9:
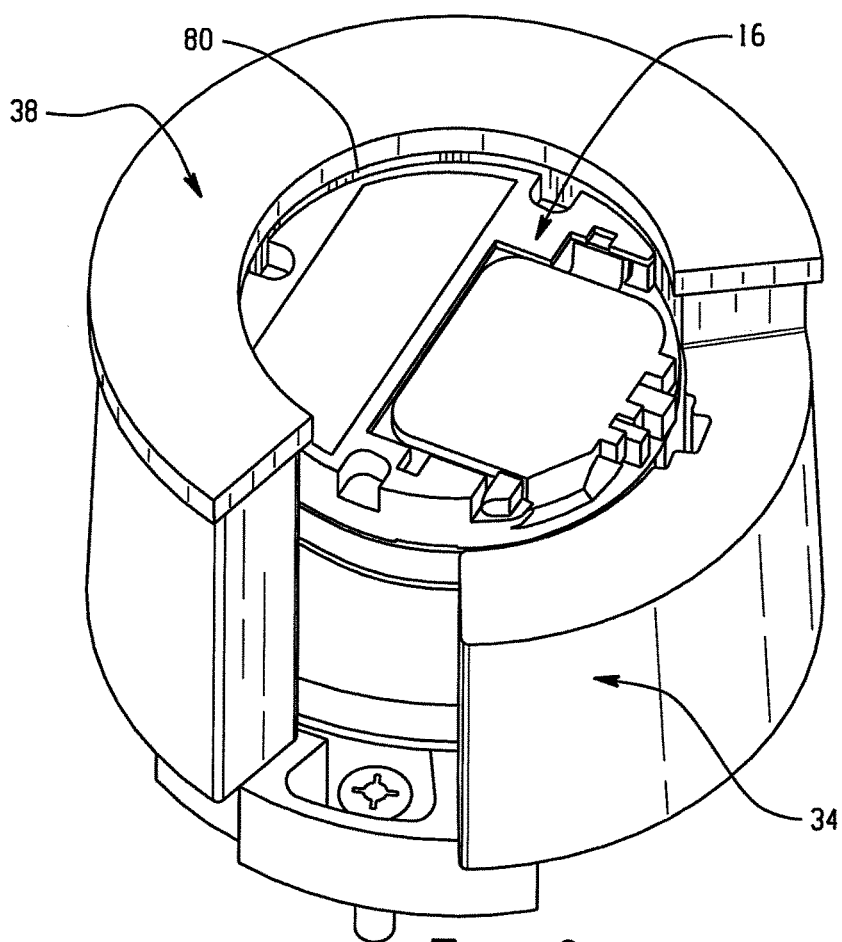
FIG. 9 is a perspective view of a heat sink and encoder assembly of FIG. 8.

Turning to FIGS. 8-9, another exemplary embodiment in accordance with the present disclosure will be described. This embodiment is similar to the embodiment shown and described in connection with FIGS. 1-5 and, accordingly, the same reference numerals are used to denote the same components. However, the exemplary embodiment of FIGS. 8-9 further includes a thermal pad 80 interposed between the encoder 16 and the heat sink 34 for improving conduction of heat from the encoder 16 to the heat sink 34. It should be appreciated that the thermal pad 80 at least partially occupies the air gap G, and facilitates a greater rate of heat transfer from the encoder 16 to the heat sink 34 as compared to air.

The thermal pad 80 can be made of a variety of suitable materials such as, for example, silicone or the like. A variety of brand name thermal pad materials are suitable for use in connection with aspects of the present disclosure. Such commercially available materials include Gap Pad® 3000S30 manufactured by the Bergquist Company, THERM-A-GAP™ manufactured or available from the Parker, and/or 3M™ Thermally Conductive Silicone Interface Pads manufactured or available from 3M. The thermal conductivity of these materials can be, for example, 3.0 W/m-K or more.

In one embodiment, the thermal pad 80 is adhesively secured to one or both of the heat sink 34 and encoder 16. It should be appreciated that the thermal pad 80 can be flexible and/or resilient so as to accommodate relative movement between the encoder 16 and heat sink 34 while maintaining thermal contact with each component. The flexible and/or resilient nature of the thermal pad 80 can further ease installation of the heat sink 34 around the encoder 16, and can reduce or eliminate tolerance requirements for these components. In some embodiments, the thermal pad 80 can substantially fill the entire air gap G between the encoder 16 and the heat sink 34, while in other embodiments the thermal pad 80 may be discontinuous about the circumference of the encoder 16.

The heat exemplary heat sinks 34 and 60 described can be solid monolithic structures, for example cast or forged components, and can be made of a variety of materials including aluminum, for example. Accordingly, the heat sinks are generally inexpensive to manufacture. Moreover, the heat sinks can be retrofitted to existing electric motor designs without the need to change housing components and without an increase in motor profile.

For example, it will be appreciated that the heat sinks disclosed herein, along with the thermal insulation, etc., can be installed in the encoder compartment of existing motors. This provides a low cost solution to temperature issues associated with encoders, without increasing the motor profile. Accordingly, electric motor assemblies including these features can attain higher torque/RPM ratings for a given electric motor, allowing the motor to reach design parameters without resorting to expensive cooling techniques and/or without requiring the selection of a next larger motor size.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An electric motor assembly comprising:
a housing;
an electric motor supported in a motor compartment of the housing;
an encoder operatively coupled to the electric motor and supported in an encoder compartment of the housing;
a thermal insulator between the motor compartment and the encoder compartment for thermally isolating the motor compartment from the encoder compartment;
a heat sink surrounding at least a portion of the encoder, the heat sink in thermal contact with an end cap of the housing at least partially defining the encoder compartment, whereby the heat sink is adapted to absorb heat from the encoder and conduct heat to the end cap; and
a first thermal pad interposed between the encoder and the heat sink;
wherein the first thermal pad is a resilient thermal pad interposed in an annular space between the encoder and the heat sink.

2. An electric motor assembly as set forth in claim 1, wherein the first thermal pad is a silicone fiberglass reinforced thermal pad.

3. An electric motor assembly as set forth in claim 1, wherein the first thermal pad secured to at least one of the encoder or heat sink.

4. An electric motor assembly as set forth in claim 3, further comprising an adhesive securing the first thermal pad to at least one of the encoder or heat sink.

5. An electric motor assembly as set forth in claim 1, wherein the heat sink includes a central cavity adapted to receive the encoder.

6. An electric motor assembly as set forth in claim 5, wherein the encoder and the heat sink are generally cylindrical and arranged coaxially.

7. An electric motor assembly as set forth in claim 1, further comprising a second thermal pad interposed between the heat sink and the end cap.

8. An electric motor assembly as set forth in claim 1, wherein the heat sink includes a plurality of radially extending fins.

9. An electric motor assembly as set forth in claim 1, wherein the heat sink is a monolithic cast structure.

10. An electric motor assembly as set forth in claim 9, wherein the heat sink is diecast aluminum.

11. An end cap assembly for an electric motor assembly comprising:
an end cap housing having an encoder compartment;
a heat sink mounted to the end cap housing;
wherein the heat sink includes a cavity extending between and opening to opposite axial end faces of the heat sink for receiving an encoder of the electric motor assembly, and a first thermal pad fixed to an inner circumferential surface of the cavity, the heat sink being in thermal contact with the end cap housing whereby when the end cap assembly is attached to an electric motor, the heat sink is adapted to absorb heat from the encoder and conduct heat to the end cap housing;
wherein the first thermal pad is a resilient thermal pad.

12. An end cap assembly as set forth in claim 11, wherein the first thermal pad is a silicone fiberglass reinforced thermal pad.

13. An end cap assembly as set forth in claim 11, wherein the first thermal pad is secured to at least one of the encoder or heat sink.

14. An end cap assembly as set forth in claim 13, further comprising an adhesive securing the first thermal pad to at least one of the encoder or heat sink.

15. An end cap assembly as set forth in claim 11, wherein the heat sink is an annular shape.

16. An end cap assembly as set forth in claim 11, wherein the cavity is cylindrical and centrally located.

17. An end cap assembly as set forth in claim 11, wherein the heat sink is a monolithic cast structure.

18. An end cap assembly as set forth in claim 14, wherein the heat sink is diecast aluminum.

19. An electric motor assembly as set forth in claim 1, wherein the resilient thermal pad accommodates relative movement between the encoder and the heat sink.

20. An end cap assembly as set forth in claim 11, wherein the first thermal pad accommodates relative movement between the heat sink and encoder.

* * * * *